(12) United States Patent
Sauer et al.

(10) Patent No.: US 7,479,288 B2
(45) Date of Patent: Jan. 20, 2009

(54) NANOPARTICULATE PREPARATION

(75) Inventors: Hans-Martin Sauer, Darmstadt (DE);
Elisabeth Cura, Darmstadt (DE);
Sohaib Elgimiabi, Dreieich (DE); Rolf Hempelmann, St. Ingbert (DE); Frank Meyer, Saarbrücken (DE); Stefan Spiekermann, Darmstadt (DE)

(73) Assignee: Henkel Kommanditgesellschaft Auf Aktien, Duesseldorf (DE)

( * ) Notice: Subject to any disclaimer, the term of this patent is extended or adjusted under 35 U.S.C. 154(b) by 601 days.

(21) Appl. No.: 10/872,808

(22) Filed: Jun. 21, 2004

(65) Prior Publication Data

US 2008/0308222 A1 Dec. 18, 2008

Related U.S. Application Data

(63) Continuation of application No. PCT/EP02/14307, filed on Dec. 16, 2002.

(30) Foreign Application Priority Data

Dec. 21, 2001 (DE) ................ 101 63 399

(51) Int. Cl.
*A61K 49/00* (2006.01)
*A01N 59/16* (2006.01)
*A01N 55/00* (2006.01)
*A61F 13/00* (2006.01)

(52) U.S. Cl. .................. 424/647; 424/9.3; 424/422; 514/502

(58) Field of Classification Search ................ 424/647, 424/9.3, 422; 514/502
See application file for complete search history.

(56) References Cited

U.S. PATENT DOCUMENTS

| | | | |
|---|---|---|---|
| 4,680,130 | A | 7/1987 | Hibst |
| 6,183,658 | B1 | 2/2001 | Lesniak et al. |
| 6,541,039 | B1 | 4/2003 | Lesniak et al. |
| 6,678,821 | B1 | 1/2004 | Waugh et al. |
| 6,764,569 | B1 | 7/2004 | Becher et al. |

| | | | |
|---|---|---|---|
| 2004/0026028 | A1 | 2/2004 | Kirsten et al. |
| 2004/0108220 | A1 | 6/2004 | Stephan et al. |

FOREIGN PATENT DOCUMENTS

| | | |
|---|---|---|
| CA | 2 299 353 | 2/1999 |
| CA | 2 362 502 | 8/2000 |
| DE | 34 35 698 A1 | 4/1986 |
| DE | 196 14 136 A1 | 10/1997 |
| DE | 197 26 282 A1 | 12/1998 |
| DE | 198 00 294 A1 | 7/1999 |
| DE | 198 32 629 A1 | 2/2000 |
| DE | 199 04 835 A1 | 8/2000 |
| DE | 199 23 625 A1 | 11/2000 |
| DE | 199 24 138 A1 | 11/2000 |
| DE | 100 37 883 A1 | 2/2002 |
| EP | 0 498 998 A2 | 5/2001 |
| WO | WO 97/38058 A1 | 10/1997 |
| WO | WO 99/07774 A1 | 2/1999 |
| WO | WO 01/14490 A1 | 3/2001 |
| WO | WO 01/28771 A1 | 4/2001 |
| WO | WO 01/30932 A2 | 5/2001 |

OTHER PUBLICATIONS

U.S. Appl. No. 10/872,664, filed Jun. 21, 2004, Kliss et al.
Fannin et al., "Field dependence of the dynamic properties of colloidal suspensions of $Mn_{0.66}Zn_{0.34}Fe_2O_4$ and $Ni_{0.5}Zn_{0.5}Fe_2O_4$ particles", Journal of Magnetism and Magnetic Materials, vol. 201, pp. 98-101 (1999).
Bhosale et al., "Bulk magnetic studies on Cu-Mg-Zn ferrites", Journal of Materials Science Materials in Electronics, vol. 9, pp. 331-336 (1998).
Fannin et al., "On The Dynamic Properties of Colloidal Suspensions of $Mn_xFe1-xFe_2O_4$ Spinal Ferrite Particles As A Function of Stoichiometry", IEEE, 1 page (1997).
Dias et al., "Sintering Studies of Hydrothermal NiZn Ferrites", J. Phys. Chem. Solids, vol. 58, No. 4, pp. 543-549 (1997).
Kirk Othmer Encyclopedia of Chemical Technology, $3^{rd}$ Edition, vol. 15, Chapter: Microwave Technology.
G. Habenicht, "Kleben: Grundlagen, Technologie, Anwendungen", $3^{rd}$ Edition, Chapter 2.3.4.4 (1997), German.

*Primary Examiner*—Maryam Monshipouri
(74) *Attorney, Agent, or Firm*—Woodcock Washburn LLP (57) ABSTRACT

The invention relates to nanoparticulate preparations containing at least one mixed metal oxide in the form of supramagnetic, nanoscale particles, methods for heating such a preparation, and methods for producing and dissolving adhesive compounds of the basis of said preparations.

10 Claims, 3 Drawing Sheets

NANOPARTICULATE PREPARATION

CROSS REFERENCE TO RELATED APPLICATIONS

This application is a continuation of PCT/EP02/14307, filed Dec. 16, 2002, which claims the benefit of DE 101 63 399.8, filed Dec. 21, 2001, the complete disclosures of which are hereby incorporated by reference in their entirety.

FIELD OF THE INVENTION

This invention relates to nanoparticulate preparations containing at least one metal mixed oxide in the form of superparamagnetic nanoscale particles, and to a process for heating such a preparation, as well as to processes for forming and dissolving adhesive bonds based on the preparations.

BACKGROUND

Preparations of particles with particle sizes in the nanometer range (nanoscale particles) are used in many branches of industry. This applies in particular to dispersions which contain particles with magnetic, ferroelectric or piezoelectric properties and which can be heated using magnetic, electrical or electromagnetic alternating fields. Such dispersions are used, for example, for the production of adhesives and sealants which cure under the effect of the heat induced by application of magnetic, electrical or electromagnetic alternating fields or where an existing adhesive bond is dissolved. In many branches of industry, particularly in the metal-processing industry, for example the aircraft industry, the motor industry, in the manufacture of utility vehicles and the associated supplier industries or even in the production of machines and domestic appliances and in the building industry, corresponding adhesives and sealants are being increasingly used to join identical or different, metallic and nonmetallic substrates together by adhesion or sealing. This method of joining structural components is increasingly replacing conventional joining techniques, such as riveting, screwing or welding, because bonding/sealing offers a number of technological advantages, for example in regard to possible recycling of the components used.

DE-A 199 23 625 describes a process for the production of redispersible metal oxides or metal hydroxides with a volume-weighted mean crystallite size of 1 to 20 nm which are particularly suitable for so-called magnetic fluids (ferrofluids).

DE-A 199 24 138 describes adhesive compositions which contain nanoscale particles with ferromagnetic, ferrimagnetic, superparamagnetic or piezoelectric properties in the binder system and which are suitable for forming dissolvable adhesive bonds. The adhesive bonds can be heated by electromagnetic radiation to such high temperatures that easy dissolving (debonding) is possible.

WO 01/30932 describes a process for the adhesive separation of adhesive bonds. The adhesive bond comprises a heat-softenable thermoplastic adhesive layer or a heat-cleavable thermoset adhesive layer and a primer layer, the primary layer containing nanoscale particles which can be heated by electromagnetic alternating fields.

WO-A 01/28771 describes a microwave-curable composition containing particles capable of absorbing microwaves with a Curie temperature which is higher than the curing temperature of the composition. The particles capable of absorbing microwaves can be ferrites, for example.

EP-A-0 498 998 describes a process for the microwave heating of a polymer material to a predetermined temperature, the polymer material containing dispersed ferromagnetic particles with a Curie temperature which corresponds to the temperature to be reached by the microwave heating. The particle diameter of the ferromagnetic material is in the range from 1 to 100 nm; the Curie temperature is in the range from 50 to 700° C. The target heating temperature can be, for example, the curing or melting temperature of the polymer material or the temperature required to activate a cleavage reaction.

WO 01/14490 describes a process for bonding substrates with hotmelt adhesives which are used in combination with a microwave-activatable primer.

Unpublished German patent application P 100 37 883.8 describes a process for heating a substrate containing metallic, magnetic, ferrimagnetic, ferromagnetic, antiferromagnetic or superparamagnetic particles with a mean particle size of 1 to 5000 nm, the substrate being exposed to microwave radiation with a frequency of 1 to 300 GHz and, at the same time, to a d.c. magnetic field of which the field strength is at least twice as high as the strength of the earth's magnetic field.

The disadvantage of the nanoparticulate compositions mentioned above lies in the inadequate utilization of the energy introduced. Such systems generally have a high content of dispersed particles of which only a small proportion is capable of absorbing magnetic, electric or electromagnetic radiation of a certain applied frequency and hence contributes towards heating. Besides the high cost of the nanoscale particles used, which makes such compositions uneconomic, other disadvantages, for example in regard to the rheological properties of the systems and the properties of the bond (embrittlement tendency), are generally associated with a high content of dispersed particles.

SUMMARY

The problem addressed by the present invention was to provide nanoparticulate preparations which would ensure better utilization of the energy introduced than the preparations known from the prior art. They would be particularly suitable as, or for the production of, adhesive compositions of which the adhesive properties can be modified by heating.

It has now surprisingly been found that this problem is solved by a nanoparticulate preparation which contains in a dispersant at least one metal mixed oxide in the form of superparamagnetic nanoscale particles with a volume-averaged particle diameter of 20 to 100 nm which comprises a divalent and a trivalent metal component, the divalent metal component comprising at least two different divalent metals.

DETAILED DESCRIPTION

Accordingly, the present invention relates to a nanoparticulate preparation containing a coherent phase and at least one particulate phase dispersed therein of superparamagnetic, nanoscale particles with a volume-averaged particle diameter of 2 to 100 nm, comprising at least one metal mixed oxide with the general formula $M^{II}M^{III}O_4$, where $M^{II}$ is a first metal component which comprises at least two different divalent metals and $M^{III}$ is another metal component which comprises at least one trivalent metal, with the proviso that the stoichiometries of the individual metals are selected so that the mixed oxide is electrically neutral.

The metal mixed oxides used in accordance with the invention are preferably double oxides of the spinel type. Ferrites with the formula $M^{II}Fe_2O_4$, where $M^{II}$ is a metal component comprising at least two different divalent metals, are preferably used. One of the divalent metals is selected from Mn, Fe, Co, Ni, Mg, Ca, Cu, Zn, Y and V and more particularly from Mn, Fe, Co and Ni. At least one other is preferably selected from Zn and Cd.

In one particular embodiment, the nanoparticulate preparations according to the invention contain at least one metal mixed oxide selected from ferrites with the general formula $(M^a_{1-x-y}M^b_xFe_x)^{II}Fe_2^{III}O_4$, wherein $M^a$ is selected from Mn, Co, Ni, Mg, Ca, Cu, Zn, Y and V, more particularly from Mn, Co and Ni, $M^b$ is selected from Zn and Cd, x=0.05 to 0.95 and preferably 0.1 to 0.8, y=0 to 0.95 and the sum of x and y is at most 1, and mixtures thereof.

$M^a$ and $M^b$ stand for a divalent metal component. Ferrites with the general formula $M^a_{1-x}M^b_xFe_2O_4$, where $M^a$ is selected from Mg, Ca, Mn, Co, Fe and Ni, $M^b$ is selected from Zn and Cd, more particularly Zn, and x=at least 0.2, are preferably used. In addition, ferrites with the general formula $M^a_{1-x}Zn_xFe_2O_4$, where x=at least 0.2, preferably 0.2 to 0.8 and more particularly 0.3 to 0.5, are particularly preferred.

In another particularly preferred embodiment, the preparation according to the invention contains ferrites with the general formula $Mn_{1-x}M^b_xFe_2O_4$, where Mb is selected from Zn and Cd, more particularly Zn, and x=0.2-0.5 and more particularly 0.3-0.4.

In another particularly preferred embodiment, the preparation according to the invention contains ferrites with the general formula $Co_{1-x}M^b_xFe_2O_4$, where Mb is selected from Zn and Cd, more particularly Zn, and x=0.2-0.8 and more particularly 0.4-0.6.

In another particularly preferred embodiment, the preparation according to the invention contains ferrites with the general formula $Ni_{1-x}M^b_xFe_2O_4$, where Mb is selected from Zn and Cd, more particularly Zn, and x=0.3-0.8 and more particularly 0.5-0.6.

Other particularly preferred embodiments contain lithium zinc ferrites with the general formula $Li_{1-x}Zn_{2x}Fe_{5-x}O_8$ with x=0-1, more particularly at least 0.1. One example is $LiFe_5O_8$.

"Nanoscale particles" in the context of the present invention are particles with a volume-averaged particle diameter of at most 100 nm. A preferred particle size range is 4 to 50 nm, more particularly 5 to 30 nm and, in a particularly preferred embodiment, 6 to 15 nm. Such particles are distinguished by a high uniformity in regard to their size, size distribution and morphology. The particle size is preferably determined by the UPA (ultrafine particle analyzer) method, for example by laser light back scattering. In addition, the nanoscale particles used in accordance with the invention and the preparations containing them are superparamagnetic.

Magnetic and electromagnetic alternating fields are suitable for introducing energy into the nanoparticulate preparations according to the invention. Where magnetic alternating fields are used, the superparamagnetic particles used are distinguished from the paramagnetic particles known from the prior art by the fact that they do not have any hysteresis or any remanance. This leads to distinctly more effective energy introduction and heating rates for the particles and the coherent phase surrounding them.

Advantageously, the superparamagnetic nanoscale particles used in accordance with the invention enable both the Curie temperature and the magnetic relaxation time of the particles to be optimized where energy is introduced by a high-frequency magnetic alternating field. The Curie temperature is the maximum temperature to which a magnetic material can be heated by the action of a magnetic or electromagnetic alternating field. Accordingly, it represents an intrinsic protection against overheating because the maximum reachable temperature of the nanoparticulate preparation is limited. Excessive heating of the coherent phase can therefore be avoided by suitably selecting the particles according to the Curie temperature. The Curie temperature is controlled by suitably selecting the type and particular quantity of the different divalent metals. For example, in ferrites of the $CoFe_2O_4$, $MnFe_2O_4$ or $NiFe_2O_4$ type, the Curie temperature can be reduced with increasing Zn content. The Curie temperatures of the Co—Zn ferrites are above those of the stoichiometrically analogous Mn—Zn ferrites which in turn are above those of the stoichiometrically analogous Ni—Zn ferrites. Suitable methods for calculating the Curie temperatures of certain ferrites are described in the following in the discussion of the introduction of energy by electromagnetic alternating fields.

In addition, the nanoscale particles used in accordance with the invention must have a magnetic relaxation time which correlates with the magnetic alternating field used for introducing energy. In addition, the relaxation times of all the particles used should be substantially identical to allow optimal absorption of the energy introduced. As mentioned at the beginning, this is achieved in accordance with the invention by the use of nanoscale particles which are substantially the same in regard to their particle size distribution and morphology. Like the control of the Curie temperature, adaptation of the magnetic relaxation time to the magnetic alternating field used for introducing energy ($\tau=1/2\pi f$, $\tau$=magnetic relaxation time, f=frequency applied) is advantageously achieved by a suitable choice of the type and particular quantity of the different divalent metals of the metal mixed oxide particles used. The magnetic relaxation time can therefore be adapted to the frequency of commercially available inductors so that the energy introduced can be utilized particularly effectively. In this connection, the frequency of suitable magnetic alternating fields is generally in the range from about 30 Hz to 100 mHz. Suitable frequencies are, for example, medium frequencies in the range from about 100 Hz to 100 kHz and high frequencies in the range from 10 kHz to 60 MHz and, more particularly, in the range from 50 kHz to 3 MHz. The choice of the frequency may be determined by the equipment available. In one special embodiment, the nanoparticulate preparations according to the invention contain particles with various relaxation times $\tau_1$, $\tau_2$, etc. The preparations according to the invention can thus be made multifunctional.

In a second embodiment, the nanoparticulate preparation according to the invention can be exposed to an electromagnetic alternating field for the introduction of energy. This electromagnetic alternating field is preferably the electromagnetic alternating field of a microwave radiation with a frequency in the range from ca. 0.3 to 300 GHz. In a preferred embodiment, the preparation is simultaneously exposed to a d.c. magnetic field which may have a field strength of ca, 0.001 to 10 Tesla. Where energy is introduced by an electromagnetic alternating field, the superparamagnetic nanoscale particles used in accordance with the invention advantageously enable both the Curie temperature and the resonance frequency to be optimized. So far as the possibilities for controlling the Curie temperature through the choice of the type and quantity of the two different divalent metals in the metal mixed oxide particles is concerned, reference is made to the foregoing observations on the introduction of energy by magnetic alternating fields. In addition, in the interests of good energy utilization, the preparations also have to be controlled in regard to their resonance frequency because the microwave frequencies which can be used are officially regulated.

Above all, the superparamagnetic nanoscale particles used in accordance with the invention, by virtue of their uniform particle size distribution and morphology, enable a sharp resonance frequency to be achieved in the preparations rather than an ensemble of widely distributed frequencies, as is the case with known particulate preparations. In these known preparations, the microwave absorption frequencies of the individual nanoparticles are never completely the same, so that it is only ever that fraction of the dispersed particles whose absorption frequency actually corresponds to the frequency applied which absorbs microwave energy. All other particles are inactive with the result that the energy introduced is inadequately utilized. By contrast, the nanoparticulate preparations according to the invention have a substantially Lorentz-like connection between absorption $A(B,f)$ and magnetic field B: $A=A_0/[(B-B_0(f))^2+\Delta B^2]^{1/2}$. The microwave absorption in the preparations according to the invention is far more phase-coherent than in known preparations. Accordingly, in the preparations according to the invention, a far greater percentage of dispersed particles is capable of absorbing microwave radiation with a predetermined frequency. Through this effect alone, the preparations according to the invention advantageously show distinctly improved energy utilization.

In addition, the microwave absorption frequency, like the Curie temperature, can be controlled through the choice of the type and quantity of the different divalent metals used in the metal mixed oxide particles. This is explained by way of example in the following for Mn—Zn ferrites, Co—Zn ferrites and Ni—Zn ferrites.

1. $Mn_{1-x}Zn_xFe_2O_4$:

Calculation of the Curie temperature $T_c$ as a function of the zinc content x (x=0 to 0.6)

$$T_c[° C.]=295-221x-247x^2$$

Calculation of the zinc content x for a maximum temperature $T_0$ which should not be exceeded during exposure to the microwave or magnetic field radiation:

$$x=(1.394-0.00405T_0)^{1/2}-0.447$$

(with $295 \geq T_0 \geq 70$)

Linearized approximation:

$$x=(295-T_0)/375$$

Calculation of the microwave absorption frequency $f_{abs}$ as a function of x ($0 \leq x \leq 0.7$):

$$f_{abs}(x)=\gamma[B-16K(x)/9M(x)]$$

with $\gamma=28$ GHz/T (gyromagnetic constant);

B external DC magnetic field (in Tesla);

K=−2,800−2,350x(crystal anisotropy energy density in $J/m^3$), $M=1.21 \ 10^5*(4.18+11/74x-13.17x^2)$ (spontaneous magnetization in A.m)

2. $Co_{1-x}Zn_xFe_2O_4$:

Curie temperature $T_c[° C.]=520-619x$ for x=0 to 0.8

For a given maximum temperature $T_0$, x may be calculated as follows:

$$x=(520-T_0)/619; (T_0 \text{ in } ° C., 520 \geq T_0 \geq 25)$$

The MW absorption frequency $f_{abs}$ calculates as a function of x to $$f_{abs}(x)=\gamma[B+B_A(x)]$$

$B_A(x)=0.15-0.21x$ (in Tesla); ($0 \leq x \leq 0.7$)

3. $Ni_{1-x}Zn_xFe_2O_4$:

Curie temperature $T_c[° C.]=590-547x-201x^2$ for x=0 to 0.7

For a given maximum temperature $T_0$, x may be calculated as follows:

$$x=(4.787-0.00498T_0)^{1/2}-1.36; (T_0 \text{ in } ° C.; 590 \geq T_0 \geq 105)$$

or, in linearized approximation, $x=(590-T_0)/693$.

The MW absorption frequency $f_{abs}$ calculates as a function of x to $$f_{abs}(x)=\gamma[B-16K(x)/9M(x)]$$

K=−6,200−8,570x (crystal anisotropy energy density in $J/m^3$), $M=1.21 \ 10^5*(2.24+9.15x-5.96x^2)$ (spontaneous magnetization in A/m)

The resonance frequency of the superparamagnetic particles used can be additionally controlled by the additional use of a d.c. magnetic field. A process and an arrangement for ferromagnetic resonance activation by the simultaneous action of microwaves and a magnetic d.c. field are described in German patent application P 100 37 883.8 which is fully included in the scope of the present application. Energy utilization is further increased by optimizing resonance through a d.c. magnetic field.

The frequency of the microwave radiation applied is preferably in the range from 500 MHz to 25 GHz. For example, electromagnetic radiation of the so-called ISM (industrial, scientific and medical application) ranges, i.e. frequencies between 100 MHz and 200 GHz, may be used. Available frequencies are, for example, 433 MHz, 915 MHz, 2.45 GHz and 24.125 GHz and the co-called handy bands of 890 to 960 MHz and 1,710 to 1,880 MHz. Further information on electromagnetic alternating fields in the microwave range can be found in Kirk-Othmer, "Encyclopedia of Chemical Technology", 3rd Edition, Vol. 15, chapter entitled "Microwave technology", to which reference is made here.

In one special embodiment, the nanoparticulate preparations according to the invention contain a multifunctional particle system. This system contains two or more different particle types which have their absorption maximum at different frequencies. Suitable particle systems are, for example, those where one component absorbs at 2.45 GHz and another absorbs at 900 MHz. In order to obtain selective absorption of only one particle type of a multifunctional particle system, the above-described control of the resonance frequency through the type and quantity of the different divalent metals used and/or a d.c. magnetic field may be used.

Processes for the production of superparamagnetic nanoscale particles are known in principle. They are based, for example, on precipitation from aqueous solutions of metal salts by raising or lowering the pH value with a suitable base or acid. DE-A-196 14 136 describes a process for the production of agglomerate-free nanoscale particles, for example iron oxide particles. DE-A-199 23 625 describes a process for the production of nanoscale redispersible metal oxides and hydroxides. The disclosures of these documents are fully included in the disclosure of the present application. A suitable process for the production of superparamagnetic nanoscale particles usable in accordance with the invention comprises precipitation from acidic aqueous metal salt solutions by addition of a base. This may be done, for example, by adding a suitable quantity of a heated base to optionally heated, aqueous salt-like solutions of metal chlorides for precipitation. It has proved to be of advantage to keep to a certain temperature range during precipitation of the particles in order to obtain particles with the high magnetic field or microwave absorption capacity required. The temperature during the alkaline precipitation is in the range from 20 to 100° C., preferably in the range from 25 to 95° C. and more particularly in the range from 60 to 90° C.

In order substantially to prevent agglomeration or coalescence of the nanoscale particles and/or to guarantee ready dispersibility of the particulate phase in the coherent phase of the preparations according to the invention, the particles used are preferably surface-modified or surface-coated. The particles are preferably provided over at least part of their surface with a single-layer or multi-layer coating containing at least one compound with ionogenic, ionic and/or nonionic surface-active groups. The compounds containing surface-active groups are preferably selected from the salts of strong inorganic acids, for example nitrates and perchlorates, saturated and unsaturated fatty acids, such as palmitic acid, margaric acid, stearic acid, isostearic acid, nonadecanoic acid, lignoceric acid, palmitoleic acid, oleic acid, linoleic acid, linolenic acid and elaeostearic acid, quaternary ammonium compounds, such as tetraalkyl ammonium hydroxides, for example tetramethyl ammonium hydroxide, silanes, such as alkyl trialkoxysilanes, and mixtures thereof. DE-A-197 26 282 describes the surface modification of nanoscale particles with at least two shells surrounding the particle. WO 97/38058 describes the production of nanoscale particles surface-modified with silanes. The disclosures of the documents mentioned are fully included in the disclosure of the present specification.

If surface-modified nanoparticulate particles are used in the preparations according to the invention, the percentage content of surface modifier is generally from 1 to 50% by weight, preferably from 2 to 40% by weight and more particularly from 10 to 30% by weight, based on the weight of the particles used.

The coherent phase of the nanoparticulate preparations according to the invention is preferably selected from water, organic solvents, polymerizable monomers, polymers and mixtures thereof.

Suitable organic dispersants are selected, for example, from oils, fats, waxes, esters of $C_{6-30}$ monocarboxylic acids with mono-, di- or trihydric alcohols, saturated acyclic and cyclic hydrocarbons, fatty acids, low molecular weight alcohols, fatty alcohols and mixtures thereof. These include, for example, paraffin and paraffin oils, mineral oils, linear saturated hydrocarbons generally containing more than 8 carbon atoms, such as tetradecane, hexadecane, octadecane, etc., cyclic hydrocarbons, such as cyclohexane and decahydronaphthalene, waxes, esters of fatty acids, silicone oils, etc. Linear and cyclic hydrocarbons and alcohols, for example, are preferred.

Polymerizable monomers and polymers suitable as the coherent phase are mentioned in the following with reference to the adhesive compositions.

The nanoparticulate preparations according to the invention may advantageously be dispersed virtually as primary particles and thus form extremely stable dispersions. The rheological properties may advantageously be varied within wide limits in dependence upon the type and quantity of the dispersant. Thus, preparations with a liquid to gel-like consistency may be produced according to the desired form of application. A "gel-like consistency" is shown by compositions which have a higher viscosity than liquids and which are self-supporting, i.e. they retain a form imparted to them without any dimensionally stabilising outer envelope. The viscosity of such preparations is in the range, for example, from ca. 1 to 60,000 mPas.

The preparations according to the invention based on liquid dispersants are generally redispersible, i.e. the dispersed particles can be recovered by drying of the preparation and then re-dispersed largely without any deterioration in dispersibility or absorption capacity for magnetic and electromagnetic alternating fields.

The percentage content of the nanoscale particles is preferably from 1 to 70% by weight, more preferably from 2 to 35% by weight and most preferably from 3 to 10% by weight, based on the total weight of the nanoparticulate preparation. By virtue of the very good ability of the preparations according to the invention to absorb energy by absorbing magnetic or electromagnetic alternating fields, the proportion of dispersed particles required to absorb a certain amount of energy can be distinctly reduced compared with known particulate preparations.

In a preferred embodiment, the preparation according to the invention is an adhesive composition. The coherent phase of adhesive compositions comprises at least one polymer suitable for use in adhesives and/or at least one polymerizable monomer.

In principle, any polymers suitable for adhesives may be used as the coherent phase (binder matrix). Examples of thermoplastically softenable adhesives are hotmelt adhesives based on ethylene/vinyl acetate copolymers, polybutenes, styrene/isoprene/styrene and styrene/butadiene/styrene copolymers, thermoplastic elastomers, amorphous polyolefins, linear thermoplastic polyurethanes, copolyesters, polyamide resins, polyamide/EVA copolymers, polyaminoamides based on dimer fatty acids, polyester amides or polyether amides. Other suitable adhesive matrixes are, in principle, the known two-pack adhesives based on one- or two-component polyurethanes, one- or two-component polyepoxides, silicone polymers (one or two components), the silane-modified polymers described, for example, in G. Habenicht, "Kleben: Grundlagen, Technologie, Anwendungen", 3rd Edition, 1997, Chapter 2.3.4.4. The (meth)acrylate-functional two-pack adhesives based on peroxidic hardeners, anaerobic curing mechanisms, aerobic curing mechanisms or UV curing mechanisms are also suitable as the adhesive matrix. Actual examples of the incorporation of thermally labile groups in two-pack adhesives for the purpose of subsequently splitting these bonds are the adhesives according to WO 99/07774 of which at least one component contains disulfide or polysulfide bonds. In one particularly preferred embodiment, these adhesives may also contain solid splitting reagents in crystalline, encapsulated, chemically blocked, topologically or sterically inactivated or kinetically inhibited, finely dispersed form, as disclosed on pages 14 to 16 of hitherto unpublished DE-A-199 04 835. Another possibility is to use polyurethane adhesives containing the amine derivatives disclosed in hitherto unpublished DE-A-198 32 629 as splitting agent. The splitting agents disclosed in the two above-mentioned documents are expressly part of the present invention.

The coherent phase of heat-activatable, chemically reacting adhesives generally contains one or more components which are accessible to a polyreaction. This includes, for example, adhesives which contain polyisocyanates bearing masked heat-activatable isocyanate groups and a component bearing isocyanate-reactive groups, for example a polyol.

The present invention also relates to a process for heating a preparation as defined above, in which the preparation is exposed to a magnetic or electromagnetic alternating field.

As mentioned above, where magnetic alternating fields are used for heating, both the maximum reachable temperature or Curie temperature and the magnetic relaxation time can be simultaneously controlled. The preparation is preferably exposed for heating to a magnetic alternating field with a frequency in the range from 30 Hz to 100 MHz. Suitable frequencies are the frequencies of standard inductors, for example medium frequencies in the range from 100 Hz to 100 kHz or high frequencies in the range from 10 kHz to 60 MHz and, more particularly, in the range from 50 kHz to 3 MHz. As also mentioned above, the nanoparticulate preparations according to the invention enable the energy input of available electromagnetic radiation to be utilized particularly effectively. The same applies to heating by electromagnetic alternating fields of microwave radiation. Microwave radiation with a frequency in the range from 0.3 to 300 GHz is preferably used. All the above-mentioned, officially released microwave frequencies, such as the above mentioned ISM frequencies in the range from 100 MHz to ca. 200 GHz, are suitable. It has already been pointed out that, where electromagnetic alternating fields are used for heating, both the maximum reachable temperature or Curie temperature and the ferromagnetic resonance frequency can be simultaneously controlled. To adjust the resonance frequency, a d.c. magnetic field with a field strength of ca. 0.001 to 10 Tesla is preferably used in addition to the microwave radiation. The field strength is preferably in the range from 0.015 to 0.045 Tesla and more particularly in the range from 0.02 to 0.06 Tesla. Where the preparation is heated by electromagnetic alternating fields, the energy introduced is again utilized particularly effectively for the reasons mentioned above.

The alternating-field-induced heating of adhesive compositions by the process according to the invention is intended to modify their adhesive properties. There are two basic embodiments each with several variants. On the one hand, an adhesive composition of which the coherent phase comprises at least one heat-curable polymer and/or at least one heat-polymerizable monomer may be used for heating, curing under the effect of the heat generated. On the other hand, an adhesive composition of which the coherent phase comprises a cured (set) adhesive may be used for heating, the bond being dissolvable by the heat generated.

Accordingly, the present invention also relates to a process for forming an adhesive bond between two substrate surfaces, in which i) a preparation as defined above, of which the coherent phase comprises at least one polymerizable monomer and/or at least one heat-curable polymer, is applied to at least part of the surface of at least one of the substrates, ii) the substrate surfaces are brought into contact with one another in the region where the preparation was applied, and iii) the substrates are heated in the region where the preparation was applied by exposure to a magnetic or electromagnetic alternating field.

The formation of an adhesive bond by selective heating of an adhesive composition (bond-on-command) through the introduction of energy in the form of magnetic or electromagnetic alternating fields can be effected, for example, by a chemical reaction between suitable functional groups of the adhesive composition, as described above.

It may also be initiated by the release of a component which initiates curing, for example a monomer and/or catalyst. To this end, the components which initiate curing may be dispersed in the adhesive composition, for example in the form of microcapsules additionally containing superparamagnetic nanoscale particles. By irradiation at a suitable frequency, it is possible to generate heat optionally confined to the microcapsules, so that the microcapsules open and release the encapsulated components. With this process, the adhesive composition can be cured with very little energy input because not all the adhesive composition has to be heated.

In another suitable variant of the process, the adhesive system used to form an adhesive bond comprises a primer activatable by magnetic or electromagnetic alternating fields based on a nanoparticulate preparation according to the invention and a conventional adhesive, more particularly a hotmelt adhesive. In this variant, the adhesive system is selectively activated by local heating of the primer layer. Such processes are particularly suitable for bonding heat-sensitive substrates.

The present invention also relates to a process for dissolving an adhesive bond containing a preparation as defined above, in which the preparation is heated by exposure to a magnetic or electromagnetic alternating field and, in the case of thermoplastic adhesive bonds, the adhesive bond is heated beyond the softening point and, in the case of thermoset adhesive bonds, is heated to a temperature at which reverse cleavage occurs, so that the bonded substrates can be separated from one another, optionally under mechanical load.

The dissolving of an adhesive bond by selective heating of an adhesive composition (disbond-on-command) through the introduction of energy in the form of magnetic or electromagnetic alternating fields can be based, for example, on reversible or irreversible softening of the adhesive bond. For example, the adhesive used can be a hotmelt adhesive which reversibly softens under the effect of the heat generated by the magnetic or electromagnetic radiation. This reversible softening may be used both for bonding on command and for disbonding on command.

In another embodiment, the set adhesive contains thermally labile bonds which can be split by the heat generated. With adhesives such as these, disbonding can be effected without chemicals under conditions where the joined substrates are not significantly heated and, hence, are not heat-damaged.

In another embodiment, the adhesive composition contains cleavage reagents dispersed therein in heat-activatable form, for example in encapsulated, crystalline, chemically blocked, topologically or sterically inactivated or kinetically inhibited form. The cleavage-initiating components are present, for example, in the form of microcapsules which additionally contain superparamagnetic nanoscale particles and are dispersed in the adhesive composition. By exposure to magnetic or electromagnetic alternating fields of suitable frequency, the microcapsules can be thermally opened so that the adhesive preparation can be split. In this case, too, heating can be confined to the capsules so that the energy input required can be greatly reduced by comparison with uniform distribution throughout the composition.

As in the above-described process for forming an adhesive bond, an adhesive composition comprising at least one primer activatable by magnetic or electromagnetic alternating fields in combination with at least one adhesive may also be used in the process for dissolving an adhesive bond.

The preparations according to the invention may advantageously be multifunctionally modified. Corresponding multifunctional preparations contain at least two different types of superparamagnetic nanoscale particles which differ, for example, in their magnetic relaxation times or in their magnetic resonance frequency to such an extent that they can be individually heated. Activation of one particle type by a magnetic alternating field and of the other particle type by an electromagnetic alternating field would also be possible. Multifunctional preparations are suitable for a number of individual applications. This includes, for example, preparations which contain—in microencapsulated form—at least one curing-initiating agent and at least one cleavage-initiating agent in combination with differently activatable particles.

The following Examples are intended to illustrate the invention without limiting it in any way.

EXAMPLES

I. Synthesis of Nanoscale Ferrites with at Least Two Different Divalent Metals

Example 1

Synthesis of a Zn-Doped Nano-Cobalt Ferrite ($Co_{0.7}Zn_{0.3}Fe_2O_4$)

27.03 g $FeCl_3.6H_2O$ are dissolved in 100 ml demineralized water and stirred. 8.33 g $CoCl_2.6H_2O$ are dissolved in 35 ml water and the resulting solution is stirred after the addition of 1.5 ml conc. HCl. 2.04 g $ZnCl_2$ are dissolved in 15 ml water and the resulting solution is stirred after the addition of 1.5 ml conc. HCl (37%). Shortly before the precipitation step, all solutions are heated to 85° C. and combined. 48 g NaOH are mixed with 0.61 water and heated to boiling point. The combined metal salt solutions are added to the boiling base, followed by stirring for 30 minutes at boiling temperature.

After cooling and sedimentation through a permanent magnet, the product is washed 4 times with 250 ml distilled water and left standing overnight. The powder is freed from water at 45° C. in a vacuum drying cabinet.

Example 2

Preparation of a Zinc-Doped Nano-Nickel Ferrite ($Fe_{0.285}Ni_{0.285}Zn_{0.43}$)$Fe_2O_4$, Hydrothermal After-treatment 10.81 g $FeCl_3.6H_2O$ are dissolved in 40 ml demineralised $H_2O$ and heated to 80° C. 1.35 g $NiCl_2.6H_2O$ and 1.17 g $ZnCl_2$ are dissolved in a mixture of 8 ml $H_2O$ and 1 ml 37% HCl and likewise heated to 80° C. 1.13 g $FeCl_2.4H_2O$ are then added and dissolved. The two metal salt solutions are combined and then rapidly added with intensive stirring to a solution heated to 80° C. of 16 g NaOH in 400 ml $H_2O$. After stirring for ca. 15 minutes at 80° C., the precipitate formed is repeatedly washed with water and then dialyzed until a conductivity of 70 µS is reached in the dialysis tube. Half the product is centrifuged and taken back up in 2-propanol. This procedure is repeated three times. The paste formed is then suspended in 2-propanol and the mixture is introduced into a Teflon beaker which is filled to a volume of 160 ml. In a pressure digester (Berghof), the mixture is heated for 24 h at 220° C. (heating rate 110° C./h) and then dried.

II. Performance Properties

Example 3

Figure 1:
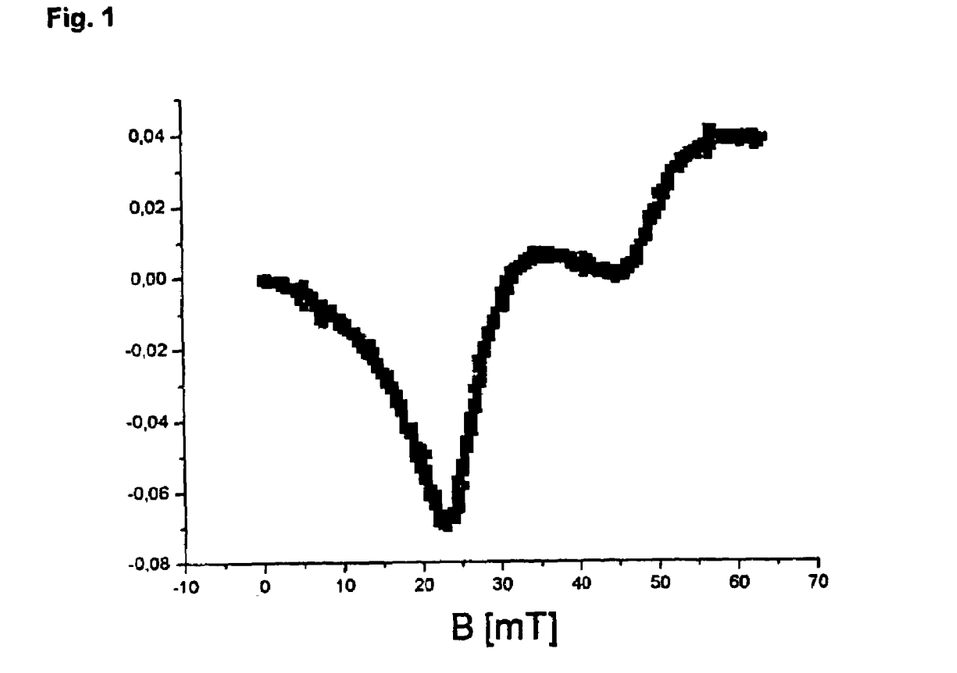
FIG. 1 shows the microwave absorption for an inventive 3% dispersion in decane.

Comparison of the microwave absorption of a nanoparticulate dispersion according to the invention with a magnetite dispersion in dependence upon an applied d.c. magnetic field FIGS. 1 (invention) and 2 (prior art) show the microwave absorptions for 3% dispersions in decane. An Ni—Zn ferrite ($Ni_{0.4}Zn_{0.6}Fe_2O_4$) with a mean particle diameter of 8 mm and a surface coating of oleic acid was used in FIG. 1 and magnetite ($Fe_3O_4$) with a mean particle diameter of 10 mm and with a surface coating of isostearic acid in FIG. 2. In both cases, the microwave frequency was 1.415 GHz.

Figure 2:
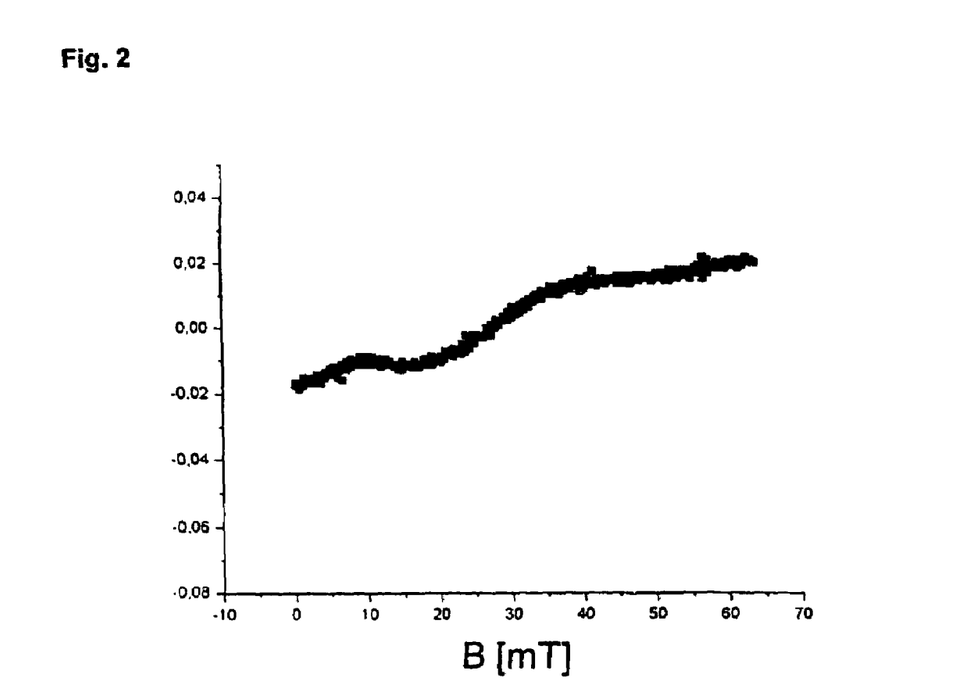
FIG. 2 shows the microwave absorptions for a prior art magnetite ($Fe_3O_4$) with a mean particle diameter of 10 mm and with a surface coating of isostearic acid.

To carry out the illustrated measurements, ca. 200 mg solution (corresponding to 6 mg ferrite) were poured into a plastic bowl and placed on a microstrip waveguide carrying microwaves with a frequency f of 1.415 GHz. The percentage change in the microwave level in the guide was measured as a function of the magnetic field strength (B=0 to 65 mT) delivered to the sample by an additional electromagnet. The instrument settings were identical for both measurements.

FIG. 1 shows a sharply pronounced minimum of the microwave signal at B=23+/−3 mT and a second, less sharply pronounced minimum at B=45+/−5 mT for the dispersion according to the invention. The level attenuation in the first minimum is ca. 7%.

FIG. 2 shows a minimum at 15+/−7 mT for the comparison dispersion. The level attenuation here is only about 1%. The microwave absorption of the magnetite dispersion in FIG. 2 largely corresponds to the absorption capacity of commercial ferrofluids produced on a magnetite basis, for example those of the APG series (Ferrofluidics). The increase in absorption in the case of the Ni—Zn ferrites according to the invention to about 7-fold in relation to the prior art signifies a marked increase in performance of the process described in P 100 37 883.8 for electromagnetic resonance activation and its use for heating particle-filled substrates.

Example 4

Comparison of Dispersibility

Figure 3:
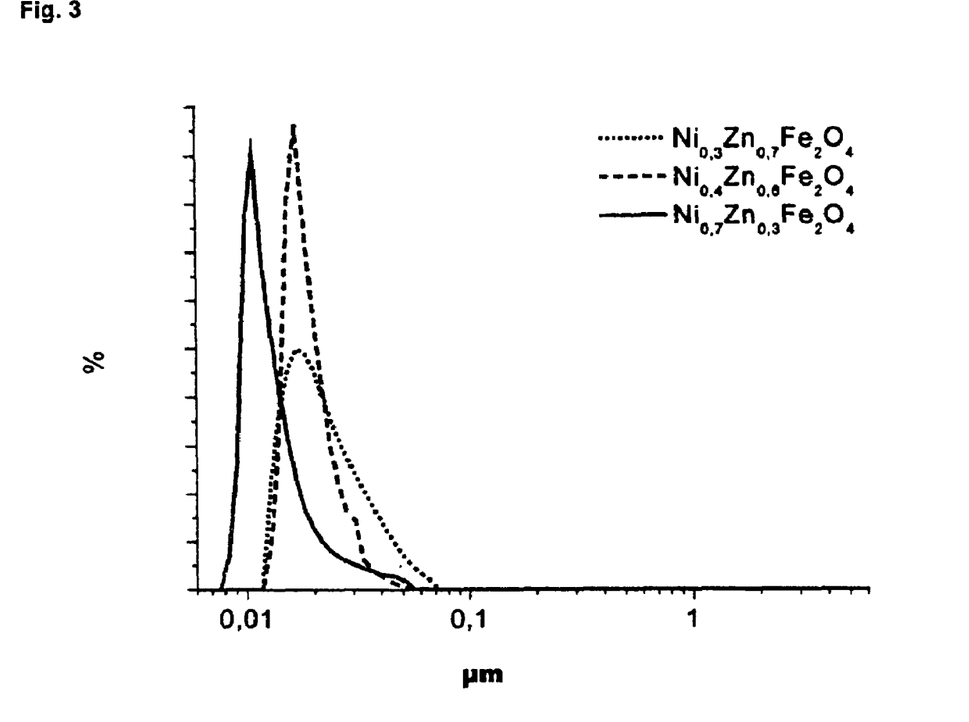
FIG. 3 the size distribution of the dispersed nanoparticles of the present invention.

FIG. 3 (invention) shows the size distribution, as determined by light scattering, of the dispersed nanoparticles of various Ni—Zn ferrites surface-modified with oleic acid. The size of the modified particles in the dispersion is in the range from 15 to 20 nm and is therefore only slightly larger than the diameter of the ferrite particles used for dispersion which was about 8 nm in every case. This shows that the nanoscale Ni—Zn ferrite particles are very uniformly distributed in the dispersion, so that the rheological properties of the solvent or polymer used as the coherent phase are largely unaffected.

Figure 4:
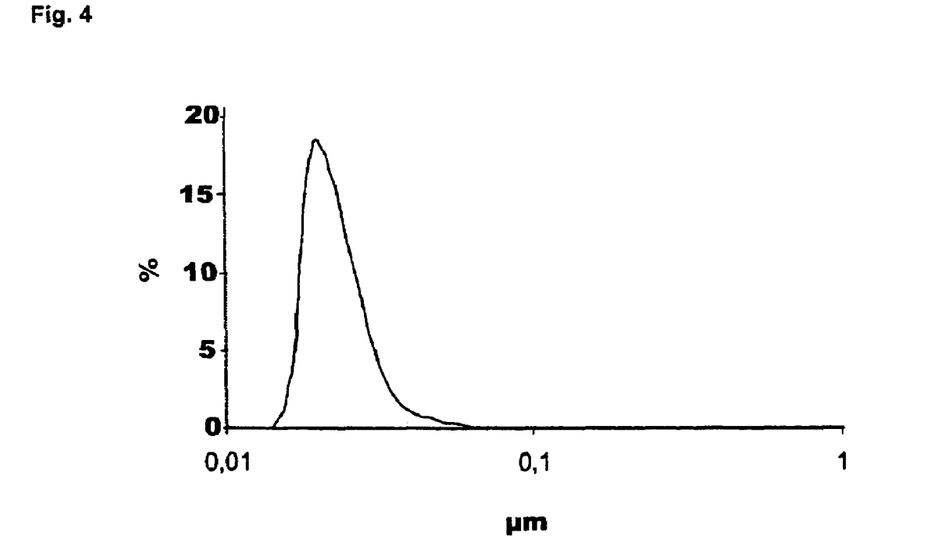
FIG. 4 the size distribution of a dispersion of prior art nanocrystalline magnetite indicative of partial agglomeration under the same conditions as FIG. 3.

By contrast, FIG. 4 (prior art) shows a dispersion of nanocrystalline magnetite produced under the same conditions. The size of the dispersed particles is in the range from ca. 30 to 40 nm which is indicative of partial agglomeration of the particles.

Example 5

Dependence of the Curie Temperatures of Co—, Mn— and Ni—Zn Ferrites on the Zinc Content TABLE 1A shows Curie temperatures of Co—, Mn— and Ni—Zn ferrites based on the zinc content.

TABLE 1A

| a) $Co_{1-x}Zn_xFe_2O_4$ | | b) $Mn_{1-x}Zn_xFe_2O_4$ | | c) $Ni_{1-x}Zn_xFe_2O_4$ | |
|---|---|---|---|---|---|
| Zn content x | T(Curie) [° C.] | Zn content x | T(Curie) [° C.] | Zn content x | T(Curie) [° C.] |
| 0 | 520 | 0 | 295 | 0 | 590 |
| 0.1 | 460 | 0.1 | 266 | 0.1 | 541 |
| 0.2 | 389 | 0.2 | 240 | 0.2 | 482 |
| — | — | 0.28 | 218 | — | — |
| 0.3 | 331 | — | — | 0.3 | 398 |
| 0.4 | 275 | 0.4 | 164 | 0.4 | 345 |
| — | — | 0.48 | 136 | — | — |
| — | — | — | — | 0.5 | 275 |
| 0.6 | 137 | 0.6 | 70 | 0.6 | 207 |
| 0.7 | 82 | — | — | 0.7 | 105 |
| 0.8 | 25 | — | — | — | — |

Example 6

Heating of Zn-Doped Nano-Cobalt Ferrites ($Xo_{1-x}Zn_xFe_2O_4$) and Nano-Manganese Ferrites ($Mn_{1-x}Zn_xFe_2O_4$) in a High-Frequency Magnetic Alternating Field The production of adhesives filled with nanoscale particles is explained with reference to the particles of Example 1.

1.1404 g of a polyamide-based hotmelt adhesive (Macromelt® 6208, Teroson) are melted in a sample tube and, after the addition of 0.0603 g of the nano-$Co_{0.7}Zn_{0.3}Fe_2O_4$ of Example 1, the melt is stirred with a glass rod and further heated until it is homogeneous. A composite containing 5% by weight nanoscale particles is obtained. The other composites from the following Table were similarly produced. The magnetic alternating field was produced with a Hüttinger TIG 5/300 generator with a normal SPI-015-040 coil.

Table 1 shows heating of composites of Macromelt® 6208 and 5% by weight $Co_{1-x}Zn_xFe_2O_4$ as a function of time.

TABLE 1

| t/s | x = 0.0 | x = 0.1 | x = 0.2 | x = 0.4 | x = 0.7 | x = 1.0 |
|---|---|---|---|---|---|---|
| 0 | 0 | 0 | 0 | 0 | 0 | 0 |
| 10 | 12 | 32 | 45 | 35 | 0 | 0 |
| 20 | 24 | 77 | 90 | 53 | 5 | 0 |
| 30 | 42 | 119 | 101 | 61 | 8 | −2 |
| 45 | 82 | 146 | 116 | 72 | 9 | 2 |
| 60 | 145 | 157 | 128 | 80 | 12 | 0 |
| 90 | 172 | 166 | 136 | 83 | 15 | −1 |
| 120 | 189 | 174 | 139 | 91 | 19 | 4 |
| 240 | 207 | 187 | 148 | 98 | 23 | 3 |
| 360 | 231 | 189 | 149 | 102 | 27 | 4 |

Table 2 shows time-dependent heating curves of composites of Macromelt® 6208 and 5% by weight $Mn_{1-x}Zn_xFe_2O_4$.

TABLE 2

| t/s | x = 0.0 | x = 0.1 | x = 0.2 | x = 0.3 | x = 0.4 | x = 0.5 |
|---|---|---|---|---|---|---|
| 0 | 18 | 18 | 18 | 18 | 18 | 18 |
| 10 | 85 | 71 | 62 | 47 | 38 | 28 |
| 20 | 129 | 103 | 79 | 65 | 52 | 37 |
| 30 | 158 | 138 | 106 | 78 | 64 | 42 |
| 45 | 198 | 155 | 118 | 92 | 75 | 49 |
| 60 | 211 | 164 | 130 | 97 | 83 | 56 |
| 90 | 220 | 177 | 144 | 115 | 96 | 62 |
| 120 | 222 | 185 | 162 | 125 | 101 | 67 |
| 240 | 238 | 201 | 182 | 143 | 116 | 78 |
| 360 | | 203 | 184 | 145 | 127 | 84 |

Example 6 shows that the energy absorption of the adhesive composites according to the invention is switched off at a certain final temperature which correlates closely with the Curie temperature and which can be adjusted through the divalent metals of the nanoscale particles used.

Figure 5:
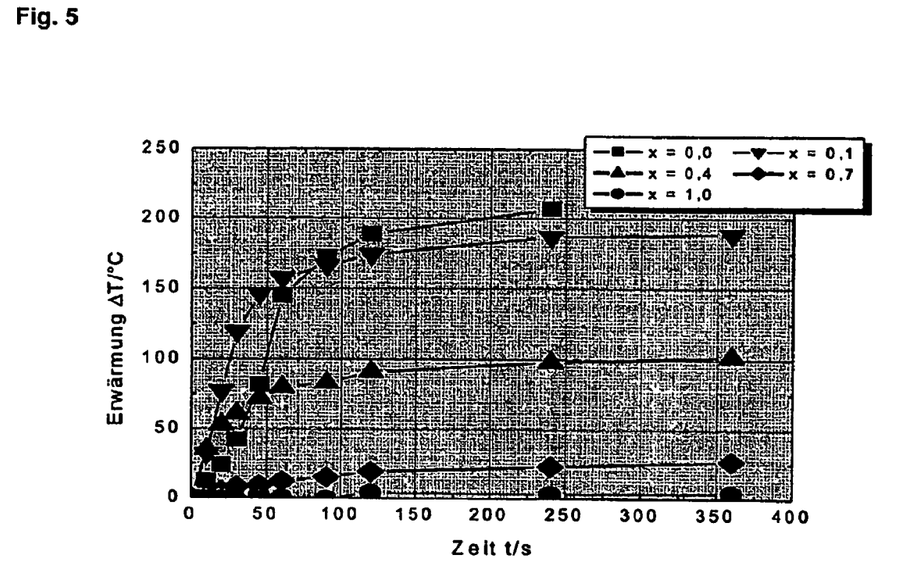
FIG. 5 shows the intrinsic limiting of temperature in the heating of $Co_{1-x}Zn_xFe_2O_4$ in a magnetic HF field by utilizing the Curie temperature.

FIG. 5 shows the intrinsic limiting of temperature in the heating of $Co_{1-x}Zn_xFe_2O_4$ in a magnetic HF field by utilizing the Curie temperature.

Example 7

Microwave Heating of $Ni_{1-x}Zn_xFe_2O_4$

Heating by microwaves (400 w, 20 s) as a function of the zinc content was determined using composites of a commercially available hot adhesive (Pattex® hot, Henkel KGaA) with a particle content of 15% by weight. The results are set out in Table 3 below.

Table 3 shows time-dependent heating curves of composites of Pattex® hot and 15% by weight $Ni_{1-x}Zn_xFe_2O_4$ with microwave heating.

TABLE 3

| Time/s | x = 0.0 | x = 0.3 | x = 0.7 |
|---|---|---|---|
| 0 | 25 | 25 | 25 |
| 20 | 109 | 57 | 48 |
| 30 | 152 | 65 | 60 |
| 40 | 179 | 84 | 69 |
| 50 | 205 | 99 | 70 |
| 60 | 215 | 119 | 69 |
| 70 | 214 | 125 | 68 |
| 80 | 216 | 129 | 71 |
| 90 | 217 | 128 | 70 |
| 100 | 216 | 127 | 71 |
| 110 | 215 | 127 | 72 |
| 120 | 216 | 128 | 73 |

Example 7 shows that, with microwave irradiation, too, the energy absorption of the adhesive composites according to the invention is switched off at a certain final temperature which correlates closely with the Curie temperature and which can be adjusted through the type and quantity of the divalent metals of the nanoscale particles used.

The disclosures of each patent, patent application, and publication cited or described in this document are hereby incorporated herein by reference, in their entireties.

Various modifications of the invention, in addition to those described herein, will be apparent to those skilled in the art from the foregoing description. Such modifications are also intended to fall within the scope of the appended claims.

What is claimed:

1. A composition comprising:
   a coherent phase; and a particulate phase dispersed therein, the particulate phase comprising surfactant and superparamagnetic, nanoscale particles with a volume-averaged particle diameter of 2 to 100 nm, said particles comprising at least one metal mixed oxide with the general formula:

$$M^{II}M^{III}O_4$$

wherein:
$M^{II}$ comprises at least two different divalent metals, and
$M^{III}$ comprises at least one trivalent metal,
with the proviso that the mixed oxide is electrically neutral, wherein the particles are at least partially coated with a single-layer or multi-layer coating containing at least one compound with ionogenic surface-active groups, ionic surface active groups, or nonionic surface groups, or any combination thereof.

2. The composition of claim 1, wherein the coherent phase is selected from water, organic solvents, polymerizable monomers, polymers and mixtures thereof.

3. The composition of claim 1, wherein the surfactant is selected from the salts of strong inorganic acids, saturated and unsaturated fatty acids, quaternary ammonium compounds, silanes and mixtures thereof.

4. The composition of claim 1, wherein the mixed oxide is selected from ferrites with the general formula:

$$(M^a{}_{1-x-y}M^b{}_xFe_y)^{II}Fe_2{}^{III}O_4$$

wherein:
$M^a$ is selected from Mn, Co, Ni, Mg, Ca, Cu, Zn, Y and V,
$M^b$ is selected from Zn and Cd,
x=0.05 to 0.95,
y=0 to 0.95, wherein the sum of x and y is at most 1,
and mixtures thereof.

5. The composition of claim 4, wherein x is 0.1 to 0.8.

6. The composition of claim 1, wherein the mixed oxide is selected from ferrites with the general formula:

$$(M^a{}_{1-x-y}M^b{}_xFe_y)^{II}Fe_2{}^{III}O_4$$

wherein:
$M^a$ is selected from Mn, Co and Ni,
$M^b$ is selected from Zn and Cd,
x=0.05 to 0.95,
y=0 to 0.95, wherein the sum of x and y is at most 1,
and mixtures thereof.

7. The composition of claim 6, wherein x is 0.1 to 0.8.

8. The composition of claim 1, wherein the volume-averaged particle diameter is in the range from 4 to 50 nm.

9. The composition of claim 1, wherein the volume-averaged particle diameter is in the range from 6 to 15 nm.

10. An adhesive comprising the composition of claim 1.

* * * * *